United States Patent [19]

Jabs et al.

[11] Patent Number: 4,874,832

[45] Date of Patent: Oct. 17, 1989

[54] MICROCAPSULES HAVING POLYURETHANE WALLS

[75] Inventors: Gert Jabs, Odenthal, Fed. Rep. of Germany; Adolf Richartz, Apapa, Nigeria

[73] Assignee: Bayer Aktiengesellschaft, Leverkusen, Fed. Rep. of Germany

[21] Appl. No.: 282,182

[22] Filed: Dec. 9, 1988

Related U.S. Application Data

[63] Continuation of Ser. No. 105,853, Oct. 7, 1987, abandoned.

[30] Foreign Application Priority Data

Oct. 22, 1986 [DE] Fed. Rep. of Germany ....... 3635822

[51] Int. Cl.$^4$ .............................................. C08G 18/30
[52] U.S. Cl. ........................................ 528/60; 528/61; 528/64; 528/66; 528/76; 528/78; 523/160; 523/161; 428/402.21; 428/402.24; 427/213.34; 427/386; 264/4; 264/4.7; 252/315.2

[58] Field of Search ....................... 528/60, 61, 64, 66, 528/76, 78; 523/160, 161; 428/402.21, 402.24; 427/213.34, 386; 264/4, 4.7; 252/315.2

[56] References Cited

U.S. PATENT DOCUMENTS

| | | | |
|---|---|---|---|
| 3,432,327 | 3/1969 | Kam et al. | 117/36.2 |
| 4,076,774 | 2/1978 | Short | 264/4 |
| 4,400,497 | 8/1983 | Blum et al. | 528/45 |
| 4,428,983 | 1/1984 | Nehen et al. | 427/213.34 |

FOREIGN PATENT DOCUMENTS 2434406  2/1975  Fed. Rep. of Germany .

*Primary Examiner*—John Kight
*Assistant Examiner*—S. Acquah
*Attorney, Agent, or Firm*—Sprung Horn Kramer & Woods

[57] ABSTRACT

Improved microcapsules have a capsule wall which contains a polyurethane which can be obtained by reacting an isocyanate with a polyether polyol which contains amino groups.

8 Claims, No Drawings

MICROCAPSULES HAVING POLYURETHANE WALLS

This is a continuation of application Ser. No. 105,853, filed Oct. 7, 1987, now abandoned.

Processes for the production of microcapsules by means of an interfacial polyaddition reaction between polyisocyanates and polyamines are know and described, for example, in German Offenlegungsschriften (German Published Specifications) 2,109,335; 2,251,381; 2,242,910; 2,120,921; 2,311,712 and 2,523,586.

In the disperse phase, both soluble isocyanates and also those which produce an emulsion with the organic liquid can be used in this manner.

In the disperse phase, both aliphatic or modified aliphatic polyisocyanates and also combinations of aliphatic polyisocyanates with aromatic polyisocyanates can be employed according to the state of the art. By reaction with the amines employed in the aqueous phase, microcapsules having polyurea as the wall material are then produced by the interfacial polyaddition process. In order to force or to control wall formation, activators/catalysts, such as tertiary amines, which are known per se are added, if appropriate.

The microcapsules prepared according to the state of the art hitherto from isocyanates and amines by interfacial polyaddition reactions contain small amounts of unreacted amines in the capsule dispersion since complete reaction is hindered to an increasing extent by the capsule wall building up until, finally, reaction no longer occurs. If the microcapsules are used for the production of carbonless copy paper, the intensity can suffer on production of copies since amines and amine compounds neutralize the acidic colour developers.

On the other hand, the microcapsules must have an adequate impermeability for this application.

Satisfactory wall formation by reaction of polyisocyanates with OH-terminated compounds has hitherto not been possible. The capsules thus produced are permeable and unstable; neither is it possible to produce such capsules which correspond to the state of the art by adding activators; i.e. wall formation from polyurethane has hitherto not been possible.

The object of the invention is to provide improved microcapsules.

The invention relates to microcapsules having a polyurethane capsule wall. According to the invention, at least 50% of the capsule wall consists of a polyurethane which is obtained by reacting a diisocyanate and/or polyisocyanate and a polyether polyol which contains at least one amino group. The amino groups are preferably groups having a tertiary nitrogen.

In another, preferred embodiment, the molecular weight of the polyether polyol is 100 to 3,000, preferably 300 to 1,500.

In a further preferred embodiment, the polyether polyol is the product of the reaction of an epoxide with ammonia and/or a diamine and/or an alkanolamine, in particular ethyanolamine, ethylene oxide and propylene oxide being particularly preferred epoxides. Suitable polyether polyols are described, for example, in Kunststoff-Handbuch [Plastics Handbook], Volume 7, Polyurethanes, Hauser Verlag [1983], p. 44.

Preferred polyisocyanates are aliphatic, cycloaliphatic, araliphatic, aromatic and heterocyclic polyisocyanates, as described, for example, by W. Siefken in Justus Liebigs Annalen der Chemie, 562, pages 75–136, for example ethylene diisocyanate, tetramethylene 1,4-diisocyanate, hexamethylene 1,6-diisocyanate, dodecane 1,12-diisocyanate, cyclobutane 1,3-diisocyanate, cyclohexane 1,3- and 1,4-diisocyanate,and also any mixtures of these isomers, 1-isocyanato-3,3,5-trimethyl-5-isocyanatomethyl-cyclohexane (DAS (German Published Specification) 1,202,785 and U.S. Patent Specification 3,401,190), hexahydrotoluylene 2,4- and 2,6-diisocyanate, and any mixtures of these isomers, hexahydrophenylene 1,3- and/or 1,4-diisocyanate, perhydrodiphenylmethane 2,4'- and/or 4,4'-diisocyanate, phenylene 1,3- and 1,4-diisocyanate, toluylene 2,4- and 2,6-diisocyanate, and any mixtures of these isomers, diphenylmethane 2,4'- and/or 4,4'-diisocyanate, naphthylene 1,5-diisocyanate, triphenylmethane 4,4',4"-triisocyanate, polyphenyl-polymethylene polyisocyanates, as obtained by aniline-formaldehyde condensation and subsequent phosgenation and described, for example, in British Patent Specifications 874,430 and 848,671, m- and p-isocyanatophenyl-sulphonyl isocyanates according to U.S. Patent Specification 3,454,606, perchlorinated aryl polyisocyanates, as described, for example, in German Auslegeschrift (German Published Specification) 1,157,601 (U.S. Patent Specification 3,277,138), polyisocyanates having carbodiimide groups, as described in German Patent Specification 1,092,007 (U.S. Patent Specification 3,152,162), diisocyanates as described in U.S. Patent Specification 3,492,330, polyisocyanates having allophanate groups, as described, for example, in British Patent Specification 761,626 and published Dutch Patent Application 7,102,524, polyisocyanates having isocyanurate groups, as described, for example, in U.S. Patent Specification 3,001,973, in German Patent Specifications 1,022,789, 1,222,067 and 1,027,394, and in German Offenlegungsschriften (German Published Specifications) 1,929,034 and 2,004,048, polyisocyanates having urethane groups, as described, for example, in Belgian Patent Specification 752,261 or in U.S. Patent Specification 3,394,164, polyisocyanates having acylated area groups, according to German Patent Specification 1,230,778, polyisocyanates having biuret groups, as described, for example, in German Patent Specification 1,101,394 (U.S. Patent Specifications 3,124,605 and 3,201,372) and in British Patent Specification 889,050, polyisocyanates prepared by telomerization reactions, as described, for example, in U.S. Patent Specification 3,654,106, polyisocyanates having ether groups, as described, for example, in British Patent Specifications 965,474 and 1,072,956, in U.S. Patent Specification 3,567,763 and in German Patent Specification 1,231,688, products of the reaction of the abovementioned isocyanates with acetals according to German Patent Specification 1,072,385, and polyisocyanates containing polymeric fatty acid radicals, according to U.S. Patent Specification 3,455,883.

It is also possible to employ the distillation residues, having isocyanate groups, which are produced in the industrial preparation of isocyanates, if appropriate dissolved in one or more of the abovementioned polyisocyanates. It is further possible to use any mixtures of the abovementioned polyisocyanates.

Suitable modified, aliphatic isocyanates are those based on hexamethylene 1,6-diisocyanate, m-xylylene diisocyanate, 4,4'-diisocyanato-dicyclohexylmethane or isophorone diisocyanate, which have at least two functional isocyanate groups per molecule.

Further suitable are polyisocyanates based on derivatives of hexamethylene 1,6-diisocyanate having a biuret structure, according to DE-AS (German Published Specification) 1,101,394, DE-AS (German Published Specification) 1,543,178, DE-OS (German Published Specification) 1,568,017 and DE-OS (German Published Specification) 1,931,055.

Polyisocyanato-polyuretonimines, as produced by carbondiimidization of hexamethylene 1,6-diisocyanate containing biuret groups using organophosphorus catalysts, by further reaction of primarily formed carbodiimide groups with isocyanate groups to form uretonimine groups.

Isocyanurate-modified polyisocyanates having more than two terminal isocyanate groups can also be used. Specifically, the preparation of isocyanurate-modified polyisocyanates based on hexamethylene diisocyanate is described in DE-OS (German Published Specification) 2,839,133. The others can be obtained analogously.

Furthermore suitable are the isocyanates of the formula (I)

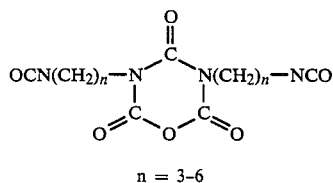

n = 3–6

Mixtures of the modified aliphatic isocyanates mentioned and the aromatic isocyanates mentioned, in particular diphenylmethane diisocyanates, which can be modified, if appropriate, can also be used.

Preferred isocyanates are biuretic hexamethylene diisocyanate blended with diphenylmethane 4,4′-isocyanate, if appropriate with a proportion of 2,4-isomer, trimerized hexamethylene diisocyanate blended with diphenylmethane 4,4′-diisocyanate, if appropriate with a proportion of 2,4-isomer, and/or isocyanate of the formula (I) (oxadiazinetrione of HDI).

Further diisocyanates are the alkylbenzene diisocyanates and alkoxybenzene diisocyanates which are specified in German Patent Applications 3,105,776 and 3,521,126 and which can also be used in the form of their biuretisocyanate-uretdione oligomers or as prepolymers.

The polyether polyols to be used according to the invention can be combined with crosslinking agents, known per se, for the interfacial polyaddition process.

Preferred amines which are suitable for interfacial reaction with the isocyanates and which also function as "crosslinking agents" are aliphatic, primary or secondary di- and polyamines, for example: ethylene-1,2-diamine, bis(3-aminopropyl)amine, hydrazine-2-ethanol, bis(2-methylaminoethyl)methylamine, 1,4-diaminocyclohexane, 3-amino-1-methyl-aminopropane, N-hydroxy-ethyl-ethylene-diamine, N-methyl-bis(3-aminopropyl)amine, 1,4-diamino-n-butane, 1,6-diamino-n-hexane, ethylene-1,2-diamine-N-ethyl-sulphonic acid (as an alkali metal salt), 1-amino-ethylene-1,2-diamine and bis(N,N′-aminoethyl)ethylene-1,2-diamine.

In the present context, hydrazine and its salts are likewise referred to as amine. In the context of the invention, preferred amines (crosslinking agents) are diethylenetriamine, hexamethylenediamine, hydrazine hydrate, diphenylmethane-4,4′-diamine and triethanolamine, and/or mixtures thereof.

The microcapsules according to the invention are particularly suitable for encapsulation of dyestuff precursors for reaction copying materials. However, the capsules can also contain other compounds, such as solvent active compounds etc.

Examples of dyestuff precursors are triphenylmethane compounds, diphenylmethane compounds, xanthene compounds, thiazine compounds and spiropyran compounds.

In particular, the following are suitable: triphenylmethane compounds: 3,3-bis-(p-dimethylaminophenyl)-6-dimethylaminophthalide ("crystal violet lactone", called "C.V.L." below) and 3,3-bis-(p-dimethylaminophenyl)-phthalide ("malachite green lactone"), diphenylmethane compounds: 4,4-bis-dimethylaminobenzhydryl benzyl ether, N-halogeno-phenylleucauramine, N-β-naphthylleucauramine, N-2,4,5-trichlorophenylleucauramine and N-2,4-dichlorophenylleucauramine; xanthene compounds: rhodamine-β-anilinolactam, rhodamine-β-(p-nitroaniline)-lactam, rhodamine-β-(p-chloroaniline)-lactam, 7-dimethyl-amine-2-methoxyfluoran, 7-diethylamine-3-methoxyfluoran, 7-diethylamine-3-methylfluoran, 7-diethylamine-3-chlorofluoran, 7-diethylamine-3-chloro-2-methylfluoran, 7-diethylamine-2,4-dimethylfluoran, 7-diethylamine-2,3-dimethylfluoran, 7-diethylamine-(3-acetyl-methylamine)-fluoran, 7-diethyl-amine-3-methylfluoran, 3,7-diethylaminefluoran, 7-diethylamino-3-(dibenzylamine)-fluoran, 7-dithylamine-3-(methylbenzylamine)-fluorane), 7-diethylamine-3-(dichloroethylamine)-fluoran and 7-diethylamine-3-(diethylamine)-fluoran; thiazine compounds: N-benzoylleucomethylene blue, o-chlorobenzoylleucomethylene blue and p-nitrobenzoylleucomethylene blue; and spiro compounds: 3-methyl-2,2′-spiro-bis-(benzo(f)-chromene).

Solvents which dissolve these dyestuff precursors are, for example, chlorinated diphenyl, chlorinated paraffin, cottonseed oil, groundnut oil, silicone oil, tricresyl phosphate, monochlorobenzene, furthermore partially hydrogenated terphenyls, alkylated diphenyls, alkylated naphthalenes, aryl ethers, arylalkyl ethers, higher alkylated benzenes and others.

Diluents, such as, for example, kerosine, n-paraffins and iso-paraffins, are frequently added to the solvents.

In order to prepare the microcapsules by the polyaddition process, the isocyanate is dissolved in the hydrophobic core materials mentioned, and this organic phase is emulsified in the continuous aqueous phase, which can contain protective colloid and, if appropriate, emulsifiers. An aqueous solution of the polyetherpolyol is added to the emulsion in the stoichiometric amount to the polyisocyanate in the organic phase.

In order to emulsify and stabilize the emulsion formed, protective colloids and emulsion auxiliaries are added to the aqueous phase. Examples of such products which act as protective colloids are carboxymethylcellulose, gelatin and polyvinyl alcohol. Examples of emulsifiers are oxethylated 3-benzylhydroxybiphenyl, products of the reaction of nonylphenol with various amounts of ethylene oxide and sorbitan fatty acid esters.

The microcapsules can be produced continuously or batchwise. In general, dispersion equipment which produce a shear gradient is used. Examples of these are blade, basket and high-speed stirrers, colloid mills, homogenizers, ultrasound dispersers, nozzles, steel nozzles nd Supraton$^R$ machines. The magnitude of the turbulence during mixing is the primary determining factor for the diameter of the microcapsules obtained. Capsules of sizes from 1 to 2,000 μm can be produced. Capsules having diameters from 2 to 20 μm are preferred.

After brief further aftertreatment, the highly concentrated suspensions can be used directly for the purpose of use intended in each case.

The suspensions can be converted into agglomerate-free capsule powders, for example by spray drying. Spray drying is particularly economic in the case of such concentrated suspensions since the amount of water to be evaporated is comparatively small.

The microcapsule dispersions containing dyestuff precursors can be used, for example, for the production of carbonless copy papers.

To this purpose, the suspensions according to the invention are provided with binders and spacers and are coated onto a backing paper or web. The formulation of such coating blends has long been the known state of the art.

However, highly concentrated coating blends can advantageously be used in the process according to the invention and, as a result, the drying of the coating compositions can be rendered more economic.

As a consequence of the high capsule content, it is also possible to use the suspensions according to the invention directly, without expensive concentration, for the preparation of aqueous flexographic printing pastes. The preparation of capsule-containing flexographic printing pastes and the production of copy papers coated over the entire surface or partially is already known. The advantage of using the suspensions according to the invention is that the concentration step required hitherto can be omitted.

Colour developers which are known per se, such as, for example, acidic clays, montmorillonites, bentonites and smectites or synthetic phenolic resins, can be employed as co-reactants for the dyestuff precursors in the microcapsules.

In copy sets, the donor component is generally the rear of the top sheet. The front of the next sheet is coated with the second colour-producing component. This coating is known as the acceptor component. In copy sets, the acceptor component is the top side of the second sheet of paper. In multiple copy sets, the following donor sheets must carry an acceptor coating on the opposite side. The production of such acceptor coatings is known and likewise described in German Offenlegungsschriften (German Published Specifications) 1,934,456 and 1,955,542.

The following examples reveal further details on carrying out the process according to the invention.

EXAMPLE 1

17.5 g of a black fluoran Colorformer (Pergascript black IBR from Ciba-Geigy AG) were dissolved in 166.2 g of chlorinated paraffine and blended with a further 166.25 g of dodecylbenzene.

32.6 g of a mixture of 8 parts of a biuret-modified hexamethylene di-isocyanate and 2 parts of diphenylmethane 4,4'-diisocyanate containing 60% of the 2,4-isomer were subsequently dissolved in the colour-producing solution.

This organic phase was mixed with 501 g of a 0.5% strength aqueous solution of a partly saponified polyvinyl acetate, and an oil/water emulsion of average droplet size 7.5 μm was prepared using a commercially available emulsifying machine.

116 g of an aqueous 15% strength ethylenediamine-initiated propylene oxide polyether solution having the OH number 630 were subsequently added. The capsule dispersion thus formed was kept at a temperature of 58° C. for 2 hours. A 40% strength microcapsule dispersion was obtained.

EXAMPLE 2

18 g of a black fluoran colour former (Pergascript black IBR from Ciba-Geigy AG) were dissolved in 171 g of chlorinated paraffine and blended with a further 171 g of dodecylbenzene.

26 g of the isocyanate mixture according to Example 1 were subsequently dissolved in the colour-producer solution.

This organic phase was mixed with 321 g of a 0.5% strength aqueous solution of a partly saponified polyvinyl acetate, and an oil/water emulsion of average droplet size 7 μm was prepared using a commercially available emulsifying machine.

92.7 g of 15% strength aqueous polyether solution (according to Example 1) were subsequently added. The capsule dispersion thus formed was kept at a temperature of 58° C. for two hours. A 40% strength microcapsule dispersion was obtained.

A sample of the paper produced was placed with the coated side upon an acceptor paper, and a further 3 base papers were placed on top. Using an electric typewriter, an area of about 4×4 cm was inscribed as densely as possible with the letter "w" using a constant stroke force. The type intensity of the copy visible on the acceptor paper was investigated by determining the loss in reflectance compared to uninscribed paper using a reflectance measuring machine (Elrephomat from Zeiss). The reflectance values were calculated according to the following formula:

$$\frac{I_o - I}{I_o} \times 100 = \text{reflectance value in \%}$$

in which
$I_o$ = reflectance value of the uncoated paper
$I$ = measured value of the sample The impermeability of the capsule wall was determined as follows:

In order to measure the impermeability, 5.0 parts of the capsule dispersion formed were diluted with 10 parts of water and subsequently mixed with 10 parts of silica sol (silica sol F 300 from Bayer AG). Using a 40 μm wire doctor blade, the mixture was applied to a base paper in an amount of about 5.5 g/m$^2$, dried and subsequently conditioned for 2 hours at 70° C. and 75% relative humidity. Any permeability becomes apparent in the papers becoming an intense blue colour since unencapsulated colour-producer solution reacts with silica to form the dyestuff.

In order to measure the tendency towards soiling (friction test), the following procedure is carried out:

A metal cylinder weighing 4.15 kg and having a circular base (φ49 mm—0.225 kg/cm$^2$) is required. This cylinder is placed on the following paper package arranged from the bottom to the top. 5 base papers/CB or CFG sample (CB side facing up) CF paper (Cf paper facing down).

The CF paper is pulled over the other, fixed papers along with the weight in a uniform movement about 15 cm long. During this procedure, a circular mark (abrasion), which can be evaluated optically and by measuring methods and which gives information on friction stabilities of the papers, is produced on the CF paper.

The reflectance value should not be <5.0% and must not exceed 10.0%.

The impermeability and tendency towards soiling are likewise recorded in figures as the reflectance value and determined using the Elrephomat as described for copying performance.

|  | Intensity | Friction | Impermeability | Wall proportion |
|---|---|---|---|---|
| Example 1 | 45.3% | 4.5% | 2.1% | 12.5% |
| Example 2 | 52.7% | 8.9% | 4.7% | 10% |

The copying performance (intensity) and the tendency towards soiling (friction) and the impermeabilities are in each case in the same order of magnitude; the final column shows that the new capsule material according to the invention permits a surprisingly low wall proportion.

What is claimed is:

1. A single walled microcapsule having a single polyurethane containing in which at least 50% of the capsule wall consists of a polyurethane which is obtained by reacting a diisocyanate and/or polyisocyanate with a polyether polyol which contains at least one tertiary amino group.

2. Microcapsules according to claim 1, in which the molecular weight of the polyether polyol is between 100 and 3,000.

3. Microcapsules according to claim 1, in which the polyether polyol is obtained from the reaction of an epoxide with an amine selected from the group consisting of ammonia, a diamine and an alkanolamine.

4. Microcapsules according to claims 3, in which the epoxide is ethylene oxide or propylene oxide.

5. Microcapsules according to claim 1, in which the polyisocyanate is an aliphatic isocyanate.

6. Pressure-sensitive reaction copy paper containing microcapsules having a single polyurethane containing capsule wall in which at least 50% of the capsule wall consists of a polyurethane which is obtained by reacting a diisocyanate and/or polyisocyanate with a polyether polyol which contains at least one tertiary amino group.

7. Copy paper according to claim 6, wherein the microcapsules enclose dyestuff precursors.

8. Microcapsules according to claim 1, enclosing dyestuff precursors.

* * * * *

UNITED STATES PATENT AND TRADEMARK OFFICE
CERTIFICATE OF CORRECTION

PATENT NO. : 4,874,832

DATED : Octoner 17, 1989

INVENTOR(S) : Gert Jabs

It is certified that error appears in the above-identified patent and that said Letters Patent is hereby corrected as shown below:

Col. 7, lines 23-24        After "microcapsule" delete "having a single polyurethane containing"

Col. 8, line 15        After "containing" insert --single walled--

Signed and Sealed this

Fifteenth Day of October, 1991

Attest:

HARRY F. MANBECK, JR.

*Attesting Officer*         *Commissioner of Patents and Trademarks*